United States Patent
Lee et al.

(10) Patent No.: US 10,091,196 B2
(45) Date of Patent: Oct. 2, 2018

(54) METHOD AND APPARATUS FOR AUTHENTICATING USER BY USING INFORMATION PROCESSING DEVICE

(71) Applicant: Suprema HQ Inc., Gyeonggi-do (KR)

(72) Inventors: Kideok Lee, Seongnam-si (KR); Hochul Shin, Seongnam-si (KR); Hyeonchang Lee, Seongnam-si (KR); Jae Won Lee, Seongnam-si (KR); Bong Seop Song, Seongnam-si (KR)

(73) Assignee: SUPREMA HQ INC., Seongnam-si (KR)

( * ) Notice: Subject to any disclaimer, the term of this patent is extended or adjusted under 35 U.S.C. 154(b) by 80 days.

(21) Appl. No.: 14/982,806

(22) Filed: Dec. 29, 2015

(65) Prior Publication Data

US 2016/0197917 A1 Jul. 7, 2016

(30) Foreign Application Priority Data

Jan. 5, 2015 (KR) .................. 10-2015-0000659

(51) Int. Cl.
*H04L 29/06* (2006.01)
*H04W 4/02* (2018.01)
(Continued)

(52) U.S. Cl.
CPC .......... *H04L 63/0861* (2013.01); *G06F 21/32* (2013.01); *H04W 4/02* (2013.01);
(Continued)

(58) Field of Classification Search
USPC .......................................................... 726/7
See application file for complete search history.

(56) References Cited

U.S. PATENT DOCUMENTS

| 6,697,947 B1* | 2/2004 | Matyas, Jr. ........... H04L 9/3231 380/282 |
| 2002/0116611 A1* | 8/2002 | Zhou .................. H04L 9/004 713/156 |

(Continued)

FOREIGN PATENT DOCUMENTS

| KR | 10-0866839 | 10/2008 |
| KR | 10-1118679 | 2/2012 |

(Continued)

*Primary Examiner* — Taghi Arani
*Assistant Examiner* — Badri Champakesan
(74) *Attorney, Agent, or Firm* — Brinks Gilson & Lione (57) ABSTRACT

A method and apparatus for authenticating a user is disclosed that includes measuring biometric information of the user to create biometric measurement information, determining whether a private key included in a user authentication request signal matches a private key issued in advance to the user, comparing pre-set biometric authentication information for the user with the biometric measurement information, calculating a matching ratio when a match is detected, authenticating the user having provided the biometric information as an authorized user based on a result of comparison of the calculated matching ratio with a pre-determined biometric authentication threshold value, and providing an updated private key to the information processing device based on a result of comparison of the calculated matching ratio with a pre-determined updated threshold value.

6 Claims, 4 Drawing Sheets

(51) Int. Cl.
*G06F 21/32* (2013.01)
*H04W 12/06* (2009.01)
*H04W 4/80* (2018.01)

(52) U.S. Cl.
CPC ............. *H04W 4/80* (2018.02); *H04W 12/06* (2013.01); *H04L 63/0853* (2013.01)

(56) References Cited

U.S. PATENT DOCUMENTS

| | | | | |
|---|---|---|---|---|
| 2004/0088562 | A1* | 5/2004 | Vassilev | G06F 21/34 726/20 |
| 2004/0164848 | A1* | 8/2004 | Hwang | G06F 21/32 340/5.82 |
| 2004/0255168 | A1* | 12/2004 | Murashita | G06K 9/00885 726/5 |
| 2006/0078177 | A1* | 4/2006 | Niinuma | G06K 9/00087 382/124 |
| 2007/0118758 | A1* | 5/2007 | Takahashi | G06F 21/305 713/186 |
| 2007/0201087 | A1* | 8/2007 | Saito | H04L 9/0825 358/1.15 |
| 2008/0056544 | A1* | 3/2008 | Aikawa | G06K 9/00885 382/124 |
| 2008/0101658 | A1* | 5/2008 | Ahern | G06F 21/32 382/115 |
| 2009/0049534 | A1* | 2/2009 | Chung | G06K 7/10346 726/7 |
| 2010/0162386 | A1* | 6/2010 | Li | G06F 21/32 726/19 |
| 2012/0304267 | A1* | 11/2012 | Yamada | G06K 9/00006 726/7 |
| 2013/0031623 | A1* | 1/2013 | Sanders | G06F 21/34 726/19 |
| 2013/0065564 | A1* | 3/2013 | Conner | G06K 19/0718 455/414.1 |
| 2013/0102252 | A1* | 4/2013 | Rasmussen | H04K 1/04 455/41.2 |
| 2013/0179684 | A1* | 7/2013 | Furukawa | G06F 21/602 713/165 |
| 2013/0212645 | A1* | 8/2013 | Takahashi | H04L 9/3231 726/3 |
| 2013/0278414 | A1* | 10/2013 | Sprigg | G08B 21/0453 340/539.12 |
| 2013/0340061 | A1* | 12/2013 | Tsukamoto | G06F 21/32 726/7 |
| 2014/0059648 | A1* | 2/2014 | Danev | H04L 9/3271 726/3 |
| 2014/0171024 | A1* | 6/2014 | Huang | H04W 4/12 455/411 |
| 2014/0240130 | A1* | 8/2014 | Xiong | G06Q 30/0269 340/573.1 |
| 2015/0067827 | A1* | 3/2015 | Lim | G06F 21/32 726/19 |
| 2015/0161459 | A1* | 6/2015 | Boczek | G06K 9/00885 382/115 |
| 2015/0269370 | A1* | 9/2015 | Phillips | G06F 21/32 726/7 |

FOREIGN PATENT DOCUMENTS

| | | |
|---|---|---|
| KR | 10-1174700 | 8/2012 |
| WO | WO2007/133037 | 11/2007 |

* cited by examiner

METHOD AND APPARATUS FOR AUTHENTICATING USER BY USING INFORMATION PROCESSING DEVICE

CROSS-REFERENCE TO RELATED APPLICATION

This application claims priority to Korean Patent Application No. 10-2015-0000659, filed on Jan. 5, 2015, the disclosure of which is incorporated herein in its entirety by reference.

FIELD OF TECHNOLOGY

The present disclosure relates to a method and an apparatus for authenticating a user by using an information processing device, and more particularly to a method and an apparatus for performing user authentication on a user who carries an information processing device.

BACKGROUND

As well known, the industry related to online e-commerce and identification verification is growing because of informatization and the development of the Internet, and there is an increasing need for personal authentication. Therefore, the limitations of using PINs (Personal Identification Numbers) or passwords already used have been found.

Meanwhile, user authentication through biometrics has been currently commercialized because of its higher security and cost effectiveness as well as user-friendliness. Although it has been used mainly in embedded systems or personal computers (e.g., ATMs (Automated Teller Machines), it is now used even in mobile devices as technology develops.

The greatest characteristic of biometric information including fingerprints does not involve a risk of forgetfulness that is associated with authentication with passwords, and is distinctive and measurable to label and describe a person in question.

In prior art technology, the aforementioned biometric information for authentication is converted to digital data to be used in devices, for example, personal computers, portable devices or servers. Therefore, if hacking the devices occurs, biometric information for authentication may be stolen. The biometric information for authentication stolen as described above may have been used for vicious biometric authentication by using forged biometric identities. Therefore, there is a need for new user authentication schemes for replacing or supplementing user authentication by using biometric information.

Recently, information processing devices have been generally used for carrying out functionalities of smartphones by applying a mobile operating system, for example, Android, i-OS (iPhone-Operating System) and Windows Mobile.

An information processing device to which the aforementioned mobile operating systems are installed provides various information processing services to its user by executing various applications based on the mobile operating systems. Such an information processing device is currently very popular and an essential portable item to have now.

SUMMARY

In view of the above, the present disclosure describes a method and an apparatus for authenticating a user by using an information processing device for very secure user authentication through private key authentication and biometric information authentication for the user carrying the information processing device, for example, a smartphone.

In accordance with an embodiment, there is provided a method for authenticating a user. The method may comprise obtaining a user authentication request signal including a private key from an information processing device, measuring biometric information of the user to create biometric measurement information, inspecting whether the private key included in the user authentication request signal matches a private key issued in advance to the user, comparing pre-set biometric authentication information for the user with the biometric measurement information and calculating a matching ratio, when a match is detected, as the result of inspection, authenticating the user having provided the biometric information as an authorized user based on a result of comparison of the calculated matching ratio with a pre-determined biometric authentication threshold value, and providing an updated private key to the information processing device based on a result of comparison of the calculated matching ratio with a pre-determined updated threshold value.

In an embodiment, the updated threshold value may be set to have a greater value than the biometric authentication threshold value.

In an embodiment, obtaining the user authentication request signal may comprise perceiving that the user authentication request signal has been obtained when a code image with the private key included in the user authentication request signal and visually outputted by the information processing device is captured, and extracting the private key from the code image.

In an embodiment, obtaining the user authentication request signal may comprise visually outputting the code image including specific information so that the information processing device captures the code image by using its camera, wherein the code image outputted by the information processing device includes the private key and the specific information.

In an embodiment, obtaining the user authentication request signal may comprise perceiving that the user authentication request signal has been obtained when the private key and user identification information are sent from the information processing device through Near Field Communication (NFC), wherein said calculating a matching ratio comprises comparing the pre-set biometric authentication information sent from the information processing device through the NFC with the biometric measurement information, and said providing the updated private key comprises sending the updated private key to the information processing device through the NFC.

In an embodiment, the method may further comprise creating updated biometric authentication information through the use of the biometric measurement information based on the result of comparison of the calculated matching ratio with the pre-determined updated threshold value, the updated biometric authentication information being provided to the information processing device through the NFC.

In accordance with another embodiment, an apparatus for authenticating a user is disclosed. The apparatus may comprise an authentication request check unit configured to obtain a user authentication request signal including a private key from an information processing device, a biometric information measurement unit configured to measure biometric information of the user to create biometric measurement information, a private key inspection unit configured to inspect whether the private key included in the user authentication request signal matches a private key issued in advance to the user, a biometric information comparison unit configured to compare pre-set biometric authentication information for the user with the biometric measurement information to calculate a matching ratio, when a match is detected as a result of inspection, an authentication unit configured to authenticate the user having provided the biometric information as an authorized user based on a result of comparison of the calculated matching ratio with a pre-determined biometric authentication threshold value, and a private key update unit configured to provide an updated private key to the information processing device based on a result of comparison of the calculated matching ratio with a pre-determined updated threshold value.

In an embodiment, the updated threshold value may be set to have a greater value than the biometric authentication threshold value.

In an embodiment, the authentication request check unit may be configured to perceive that the user authentication request signal has been obtained when a code image with the private key included in the user authentication request signal and visually outputted by the information processing device is captured, and extract the private key from the code image.

In an embodiment, the authentication request check unit may be configured to visually output the code image including specific information so that the information processing device captures the code image by using its camera, and wherein the code image outputted by the information processing device includes the private key and the specific information.

In an embodiment, the authentication request check unit may be configured to perceive that the user authentication request signal has been obtained when the private key and user identification information are sent from the information processing device through NFC. The biometric information comparison unit may be configured to compare the pre-set biometric authentication information sent from the information processing device through the NFC with the biometric measurement information. The private key update unit may be configured to send the updated private key to the information processing device through the NFC.

In an embodiment, the apparatus for authenticating the user may further comprise a biometric authentication information update unit configured to create updated biometric authentication information through the use of the biometric measurement information to the information processing device based on the result of comparison of the calculated matching ratio with the pre-determined updated threshold value, the updated biometric authentication information being provided to the information processing device through the NFC.

As set forth herein, in accordance with certain embodiments, very secure user authentication may be carried out through private key authentication and biometric information authentication for the user carrying an information processing device, for example, a smartphone.

In addition, the disclosure provided herein describes methods and apparatuses that may enhance security by updating a private key or biometric authentication information based on a matching ratio between biometric information obtained from a user and biometric authentication information, and the result of comparison with a pre-determined updated threshold.

DETAILED DESCRIPTION

Hereinafter, embodiments of the methods and apparatuses will be described in detail with reference to the accompanying drawings.

In accordance with an embodiment, a user authentication apparatus carries out user authentication for a user carrying an information processing device, for example, a smartphone. Communication between the information processing device and the user authentication apparatus may be carried out by visually outputting and capturing a code image referred to as a QR (Quick Response) code, or through short-range communication including NFC (Near Field Communication) such as WiFi (Wireless Fidelity) or Bluetooth. The QR code may be encoded, created or decoded in an information processing device with a related application and a camera, and is known as a further-advanced code system compared with the conventional barcode system in terms of usability and information contents. While a conventional barcode has a one-dimensional configuration in which at most 20 numerals may be included in its horizontal arrangement, the QR code has a two-dimensional configuration that may include up to 7,089 numerals, up to 4,296 letters, or up to 1,817 Chinese characters by using its width and length arrangement. Therefore, while a barcode may include just a specific product name or its manufacturer information, a QR code may include all of long Internet address (URL), photograph or video information, map or name card information.

Figure 1:
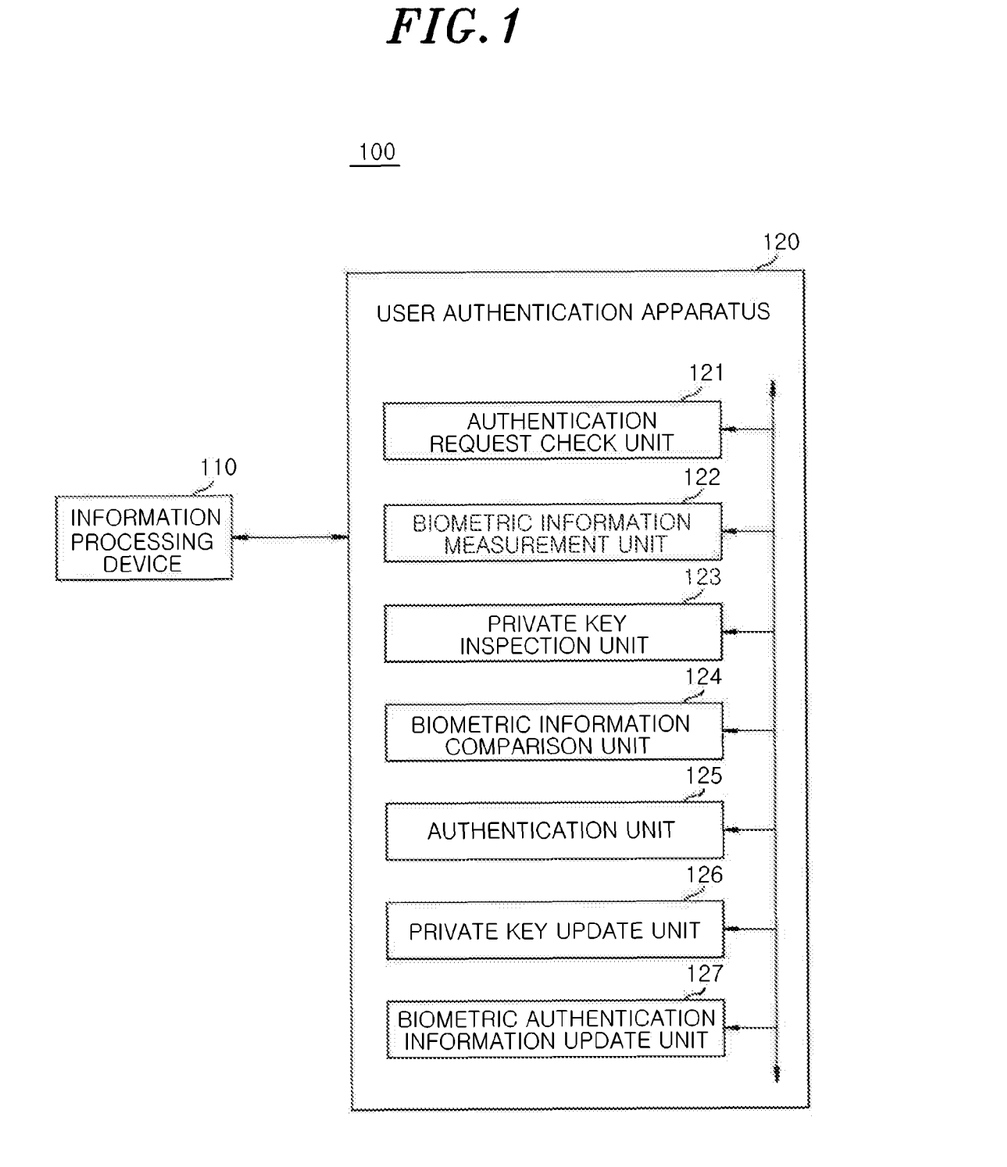
FIG. 1 illustrates a block diagram depicting a configuration of a user authentication system including a user authentication apparatus in accordance with some embodiments.

FIG. 1 illustrates a configuration of a user authentication system including a user authentication apparatus in accordance with an embodiment.

As shown in FIG. 1, the user authentication system 100 in accordance with the embodiment includes an information processing device 110 and a user authentication apparatus 120. The user authentication apparatus 120 includes an authentication request check unit 121, a biometric information measurement unit 122, a private key inspection unit 123, a biometric information comparison unit 124, an authentication unit 125, a private key update unit 126, and a biometric authentication information update unit 127.

The information processing device 110 may be equipped with an application for encoding, creating and decoding code images, for example, a QR code, and implemented with a smartphone in which a camera is incorporated for capturing code images.

The information processing device 110 may capture a code image through the camera when the code image including specific information is visually outputted by the user authentication apparatus 120. It may also extract specific information included in the captured code image, create a code image including a private key issued in advance and the extracted specific information, and then visually output the created code image to be captured by the camera. Further, the information processing device 110 may capture an updated code image including an updated private key by means of the camera when the updated code image is visually outputted by the user authentication apparatus 120, and extract the updated private key from the captured updated code image to store it for subsequent user authentication. In addition, when updated biometric authentication information is sent by the user authentication apparatus 120, the information processing device 110 stores it to use it for subsequent user authentication.

Further, the information processing device 110 may send a user authentication request signal including a private key issued in advance along with user identification information issued in advance along with its telephone number through short-range communication, for example, NFC, WiFi or Bluetooth, to the user authentication apparatus 120. Moreover, the user authentication request signal sent to the user authentication apparatus 120 by the information processing device 110 may further include biometric authentication information stored in advance in the information processing device 110. In addition, the information processing device 110 may store an updated private key or updated biometric authentication information sent by the user authentication apparatus 120 to use it for subsequent user authentication.

The user authentication apparatus 120 obtains the user authentication request signal including a private key from the information processing device 110.

Components of the user authentication apparatus 120 will be described hereinafter in detail.

The authentication request check unit 121 obtains a user authentication request signal including a private key from the information processing device 110.

The authentication request check unit 121 may visually output a code image including specific information to enable the information processing device 110 to capture the code image by the camera, perceive that user authentication is requested when the code image outputted by the information processing device 110 is captured, and extract the specific information included in the captured code image and the private key.

In addition, the authentication request check unit 121 may recognize that the user authentication request signal has been obtained when a private key and user identification information are received through short-range communication from the information processing device 110.

The biometric information measurement unit 122 measures user's biometric information to create biometric measurement information.

The private key inspection unit 123 inspects whether the private key included in the user authentication request signal matches the private key issued in advance for the user.

As the result of inspection by the private key inspection unit 123, if a match is detected, the biometric information comparison unit 124 may compare pre-set biometric authentication information for the user with the biometric measurement information and calculate a matching ratio. For example, the biometric information comparison unit 124 may compare the pre-set biometric authentication information sent through short-range communication from the information processing device 110 with the biometric measurement information.

The authentication unit 125 authenticates the user who provides biometric information as an authorized user based on the result of comparison of the matching ratio calculated by the biometric information comparison unit 124 with a pre-determined biometric authentication threshold value.

The private key update unit 126 provides an updated private key to the information processing device 110 based on the result of comparison of the matching ratio calculated by the biometric information comparison unit 124 with the pre-determined updated threshold value. For example, the private key update unit 126 may send an updated private key to the information processing device 110 through short-range communication to be used for subsequent user authentication.

The biometric authentication information update unit 127 may create and send updated biometric authentication information by using the biometric measurement information to the information processing device 110 through short-range communication to be used for subsequent user authentication based on the result of comparison of the matching ratio calculated by the biometric information comparison unit 124 with an updated threshold value.

Figure 2:
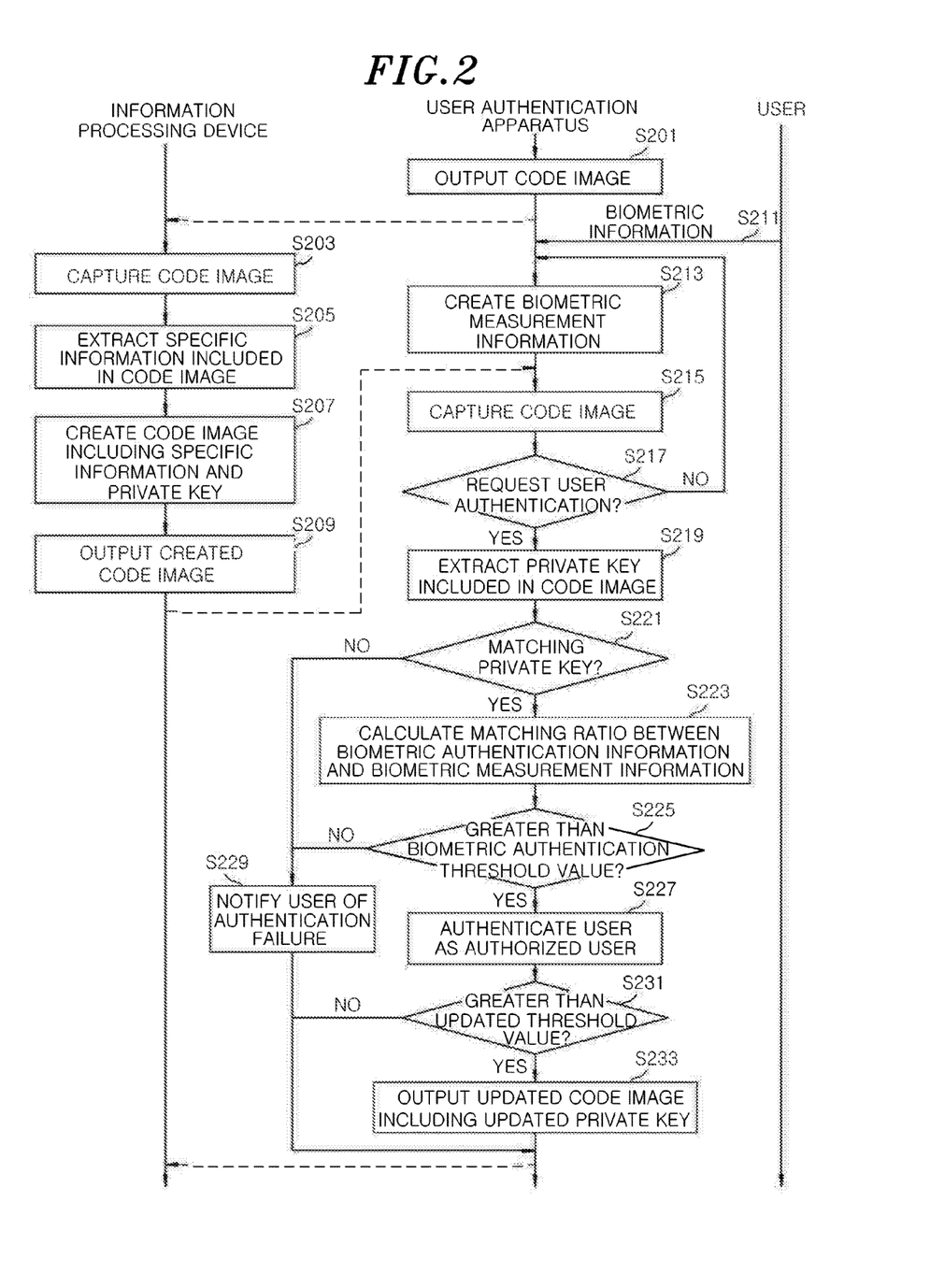
FIG. 2 illustrates a flow diagram illustrating a process for authenticating a user in accordance with some embodiments.
Figure 3:
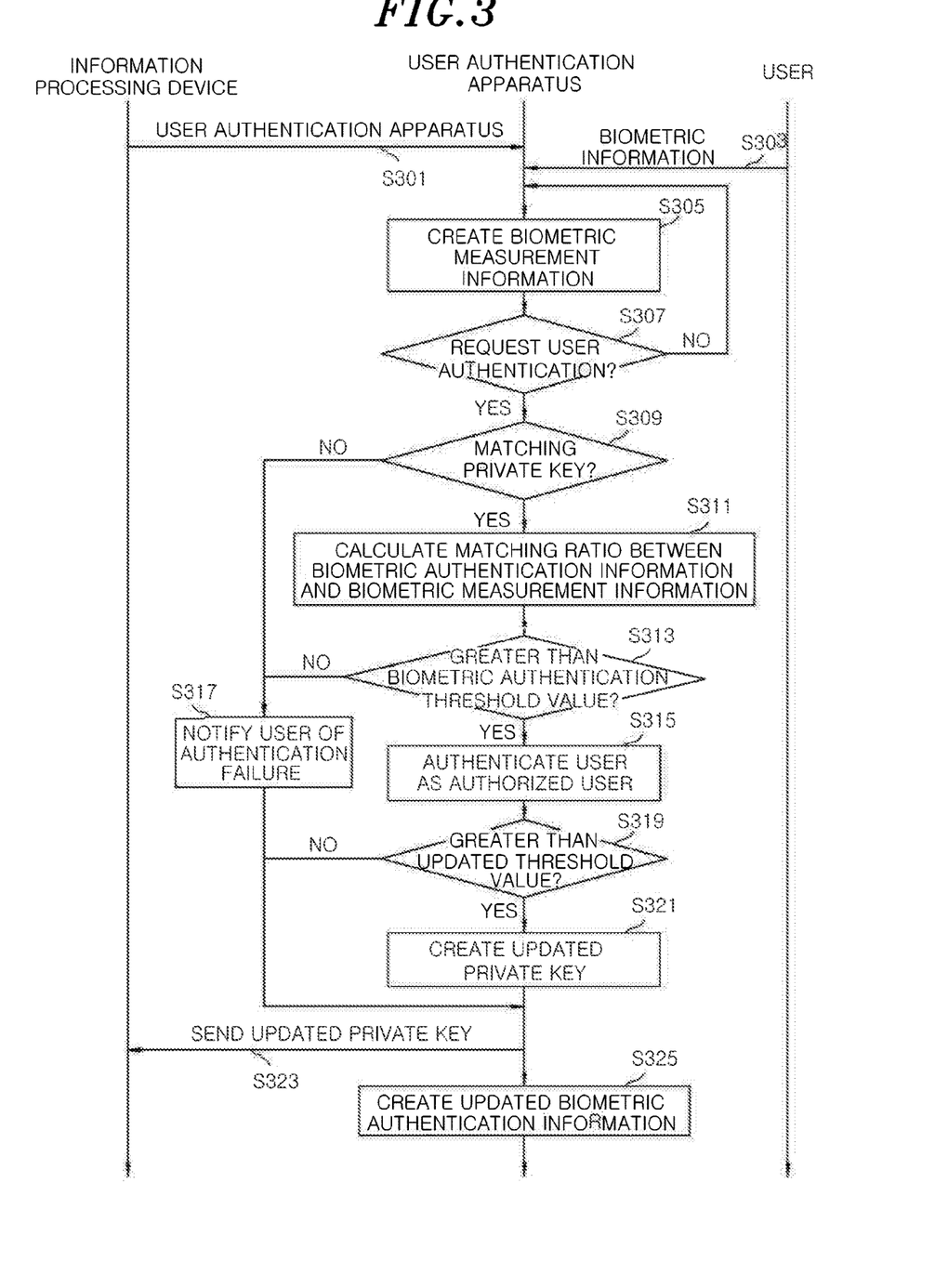
FIG. 3 illustrates a flow diagram illustrating a process for authenticating a user in accordance with some embodiments.
Figure 4:
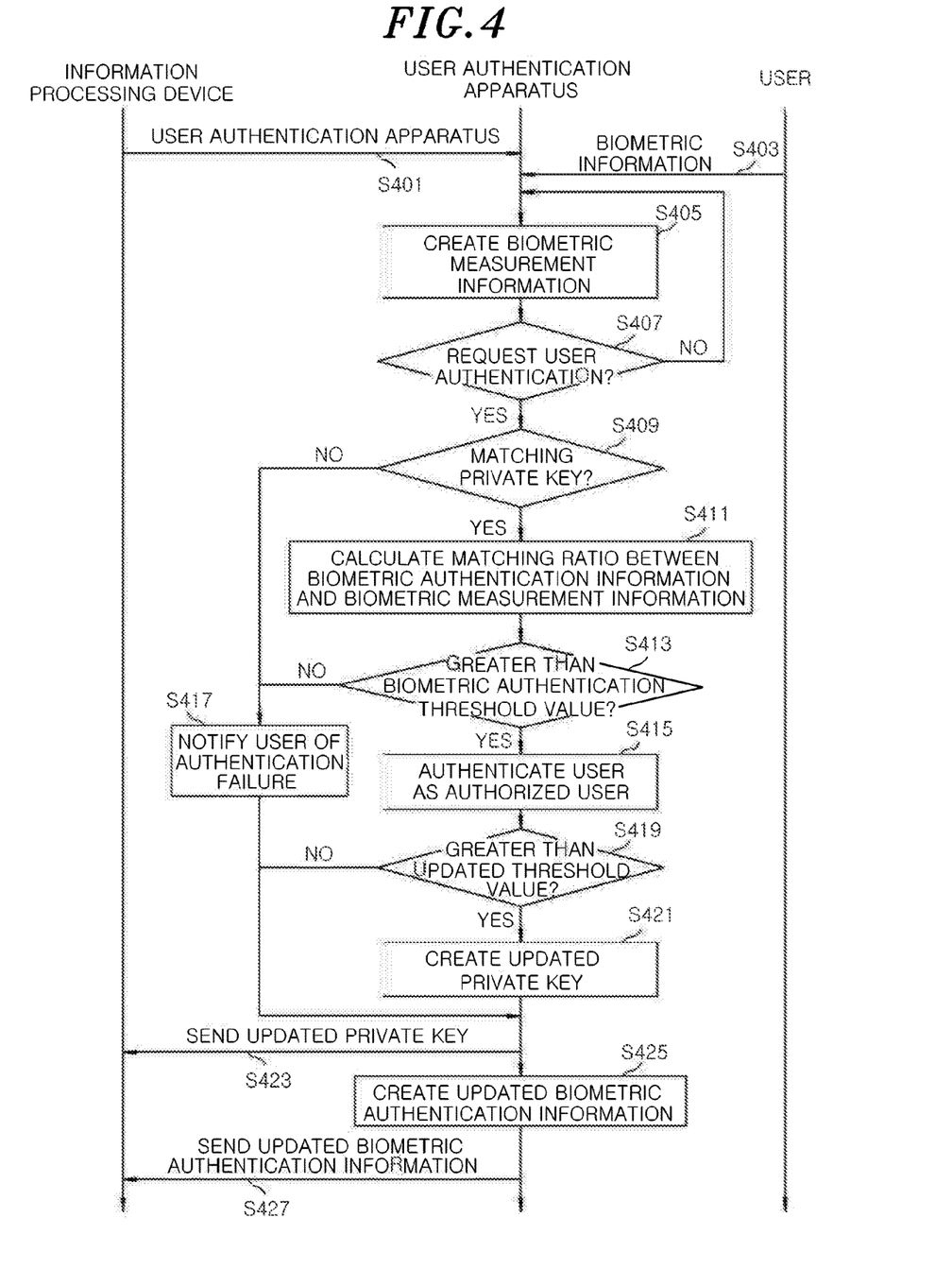
FIG. 4 illustrates a flow diagram illustrating a process for authenticating a user in accordance with some embodiments.

FIGS. 2 to 4 illustrate flow diagrams for illustrating methods of authenticating a user in accordance with embodiments.

The method for authenticating a user in the embodiment shown in FIG. 2 includes operations S201, S203, S205, S207, and S209 for visually outputting a code image including specific information to enable the information processing device to capture the code image and outputting a code image including specific information and a private key by the information processing device.

The method further includes S211 and S213 for measuring biometric information provided by a user and then creating biometric measurement information from the biometric information.

Next, the method further includes operations S215, S217, and S219 for recognizing that a user authentication request signal has been obtained when the code image visually outputted including specific information and a private key is captured by the information processing device and then extracting the private key from the captured code image.

Subsequently, the method further includes operation S221 for checking whether the private key extracted from the code image when the user authentication request signal has been obtained matches a private key issued in advance to the user by comparing the two private keys.

Next, the method further includes operation S223 for comparing the pre-set biometric authentication information for the user with the created biometric measurement information and then calculating a matching ratio, when a match is detected based on the result of the comparison of the two private keys.

In addition, the method further includes operation S225 and S227 for authenticating the user as an authorized user, when the calculated matching ratio is greater than a pre-determined biometric authentication threshold value, as the result of comparison of the calculated matching ratio with the pre-determined biometric authentication threshold value.

The method further includes operation S229 for notifying the user of authentication failure, if the calculated matching ratio is equivalent to or smaller than the pre-determined biometric authentication threshold value, as the result of comparison of the calculated matching ratio with the pre-determined biometric authentication threshold value established in advance.

Subsequently, the method further includes operations S231 and S233 for enabling the information processing device to capture an updated code image by visually outputting the updated code image including an updated private key, when the calculated matching ratio is greater than a pre-determined updated threshold value, as the result of comparison of the calculated matching ratio with the updated threshold value established in advance.

In the flow chart illustrated in FIG. 3, the method for authenticating a user includes operations S301 and S303 for sending a user authentication request signal including user identification information and a private key issued in advance for a user by the information processing device, and providing biometric information by a user for biometric authentication through short-range communication.

Subsequently, the method further includes operations S305 and S307 for recognizing that the user authentication request signal has been obtained by the user authentication apparatus 120 when the biometric measurement information is created for the user while the private key and user identification information are sent from the information processing device through short-range communication.

Next, the method further includes operation S309 for comparing the private key sent from the information processing device with a private key distributed in advance for the user.

The method further includes operation S311 for comparing the pre-set biometric authentication information for the user with the biometric measurement information and then calculating a matching ratio when there is matching between the private keys, as the result of the comparison of the two private keys.

In addition, the method further includes operations S313 and S315 for authenticating the user as an authorized user when the calculated matching ratio is greater than a pre-determined biometric authentication threshold value, as the result of comparison of the calculated matching ratio with the pre-determined biometric authentication threshold value.

The method further includes operation S317 for notifying the user of authentication failure, when the calculated matching ratio is equivalent to or smaller than the pre-determined biometric authentication threshold value, as the result of comparison of the calculated matching ratio with the pre-determined biometric authentication threshold value.

Subsequently, the method further includes operations S319, S321, and S323 for creating and then sending an updated private key to the information processing device, when the calculated matching ratio is greater than a pre-determined updated threshold value, as the result of comparison of the calculated matching ratio with the pre-determined updated threshold value.

Next, the method further includes operation S325 for creating updated biometric authentication information by using the biometric measurement information used for user authentication, when the calculated matching ratio is above the pre-determined updated threshold value, as the result of comparison of the calculated matching ratio with the pre-determined updated threshold value.

The method for authenticating a user in accordance with the embodiment illustrated by the flow chart in FIG. 4 is different from the method illustrated by the flow chart in FIG. 3 in terms of recording media for storing the biometric authentication information. While the biometric authentication information is stored in and managed by the user authentication apparatus in the embodiment illustrated in FIG. 3, it is stored in and managed by the information processing device in the embodiment illustrated in FIG. 4, that is, the information processing device functions as a TOC (Template On Card).

The method for authenticating a user in accordance with the embodiment includes operations S401 and S403 for sending a user authentication request signal including biometric authentication information and user identification information stored previously and a private key issued in advance by the information processing device, and providing biometric information for biometric authentication through short-range communication by a user.

Subsequently, the method further includes S405 and S407 for recognizing that the user authentication request signal has been obtained by the user authentication apparatus 120 if biometric measurement information is created for the user while the private key and the user identification information are received through short-range communication from the information processing device.

Next, the method further includes operation S409 for comparing the private key sent from the information processing device with a private key distributed in advance for the user to determine whether the two private keys match.

The method further includes operation S411 for comparing the pre-set biometric authentication information for the user with biometric measurement information and then calculating a matching ratio, when a match is detected, as the result of the comparison of the two private keys.

In addition, the method further includes operations S413 and S415 for authenticating the user as an authorized user, when the calculated matching ratio is greater than a pre-determined biometric authentication threshold value provided by the information processing device, as the result of comparison of the calculated matching ratio with the pre-determined biometric authentication threshold value.

In addition, the method further includes operation S417 for notifying the user of authentication failure if the calculated matching ratio is equivalent to or smaller than the biometric authentication threshold value, as the result of comparison of the calculated matching ratio with the pre-determined biometric authentication threshold value.

Subsequently, the method further includes operations S419, S421, and S423 for creating and sending an updated private key to the information processing device, when the calculated matching ratio is greater than a pre-determined updated threshold value, as the result of comparison of the calculated matching ratio with the pre-determined updated threshold value.

Next, the method further includes operations S425 and S427 for using biometric measurement information used for user authentication to create and send updated biometric authentication information to the information processing device through short-range communication, when the calculated matching ratio is greater than the pre-determined updated threshold value, as the result of comparison of the calculated matching ratio with the pre-determined updated threshold value.

The process of authenticating a user by means of the user authentication system including the user authentication apparatus in accordance with some embodiments will be described hereinafter in more detail with reference to FIGS. 1 to 4.

An exemplary first embodiment will be explained with reference to FIGS. 1 and 2.

First, a private key may be issued to the information processing device 110 used by a user, and biometric information to be used for user authentication may be obtained from the user of the information processing device 110 to create biometric authentication information. The issued private key and the created biometric authentication information are registered and stored in the user authentication apparatus 120. Specifically, the private key and the biometric authentication information may be stored in an internal memory of the biometric information comparison unit 124 and the authentication unit 125, or in a separate memory.

At this state, the authentication request check unit 121 of the user authentication apparatus 120 visually outputs a code image including specific information so that the camera of the information processing device 110 can capture the code image, at operation S201.

The information processing device 110 captures the code image being outputted from the user authentication apparatus 120 by operating the camera at operation S203.

Subsequently, the information processing device 110 performs a decoding process on an encoded content included in the captured code image to extract specific information from the decoded information at operation S205. The information processing device may also create a code image including both the extracted specific information and the private key issued in advance by encoding them at operation S207, and visually output the created code image to enable the user authentication apparatus 120 to capture the image at operation S209.

In addition, the user of the information processing device 110 may provide biometric information to the user authentication apparatus 120 when required. For example, the user cooperates with the user authentication apparatus 120 to capture the user's facial image or fingerprint image at operation S211. The camera then obtains the user's facial image or the biometric information measurement unit 122 obtains user's fingerprint image to create biometric measurement information at operation S213.

After that, the information processing device 110 outputs the code image and the camera that may be incorporated in the authentication request check unit 121 then captures the code image at operation S215.

In this case, the authentication request check unit 121 perceives that the information processing device 110 requested user authentication when the captured code image maybe input thereto and the biometric measurement information may also be created at operation S217.

As such, when it is perceived that user authentication has been requested, the private key inspection unit 123 decodes the encoded content included in the code image captured at operation S215 to extract a private key from the decoded information at operation S219.

Subsequently, the private key inspection unit 123 inspects whether the private key extracted at operation S219 matches a private key issued in advance to the information processing device 110 at operation S221.

In addition, the biometric information comparison unit 124 compares the biometric measurement information created at operation S213 with the pre-set biometric authentication information to calculate a matching ratio at operation S223.

Subsequently, the authentication unit 125 compares the matching ratio calculated at operation S223 with a pre-determined biometric authentication threshold value at operation S225 to authenticate the user of the information processing device 110 as an authorized user or notify the user of authentication failure based on the result of the comparison. For example, when the calculated matching ratio is greater than the biometric authentication threshold value, the user is authenticated as an authorized user at operation S227, but notified of authentication failure when the matching ratio is equivalent to or smaller than the biometric authentication threshold value at operation S229.

Herein, biometric authentication in accordance with some embodiments may be carried out in the manner of 1:1 biometric authentication for comparing biometric information after a user is first specified by means of a private key issued in advance. In this case, it is possible to use relatively smaller biometric authentication threshold values in comparison with 1:N biometric authentication for comparing biometric information without specifying a user. This is because a private key-based authentication has been primarily carried out.

Further, the private key update unit 126 compares the matching ratio calculated at operation S223 with a pre-determined updated threshold value at operation S231, and may update the private key issued to the information processing device 110 based on the result of comparison. For example, if the calculated matching ratio is greater than the updated threshold value at operation S231, the unit 126 visually outputs the updated code image including the updated private key to enable the information processing device 110 to capture the image at operation S233.

The information processing device 110 may then use its camera to capture the code image being outputted by the user authentication apparatus 120, and extract the updated private key from the captured code image to substitute the updated private key for the private key used before. Therefore, although the private key is stolen, security is soon enhanced by updating the private key.

Meanwhile, the updated threshold value used at operation S231 may be generated to be greater than the biometric authentication threshold value used at operation S225. This aids to ensure maximized security of the private key. Although user authentication is carried out twice through S221 and S225, the private key may still be stolen. For example, when the information processing device 110 of the authorized user is used by a third-party user to masquerade as the authorized user for user authentication, 1:1 biometric authentication uses relatively smaller biometric authentication threshold values in comparison with 1:N biometric authentication as described above. Therefore, when the third-party user has similar biometric information, the third-party user may be authenticated as an authorized user. In this case, when the private key is updated, the original authorized user may be notified of authentication failure in subsequent user authentication.

However, when the updated threshold value used at operation S231 is established greater than the biometric authentication threshold value used at operation S225, the private key will not be updated although a third-party user with similar biometric information is authenticated as an authorized user. Therefore, the original authorized user may not be notified of authentication failure in subsequent user authentication.

An exemplary second embodiment will be explained below with reference to FIGS. 1 and 3.

First, a private key may be issued to the information processing device 110 used by a user, and biometric information to be used for user authentication may be obtained from the user of the information processing device 110 to create biometric authentication information. The issued private key and the created biometric authentication information are registered and stored in the user authentication apparatus 120. In this case, the identification information of the user of the information processing device 110 is also registered and stored. For example, if the information processing device 110 is a smartphone or the like, its telephone number may be used as user identification information. The aforementioned user identification information, the private key and the biometric authentication information may be stored in an internal memory of the biometric information comparison unit 124 and the authentication unit 125, or in a separate memory.

At this state, the user of the information processing device 110 operates the information processing device 110 to send the user identification information and the private key to the user authentication apparatus 120 when user authentication is required. In this case, the information processing device 110 and the user authentication apparatus 120 send/receive information each other through short-range communication, for example, NFC, WiFi and Bluetooth, at operation S301. The user of the information processing device 110 provides biometric information to the user authentication apparatus 120. For example, the user cooperates with the user authentication apparatus 120 to capture the user's facial image or fingerprint image at operation S303. As a result, the camera may obtain the user's facial image or the biometric information measurement unit 122 may obtain the user's fingerprint image to create biometric measurement information at operation S305.

During this operation, the authentication request check unit 121 perceives that user authentication has been requested by the information processing device 110 when the private key is received at operation S301 and biometric measurement information is created in the biometric information measurement unit 122, at operation S307.

As described above, when it is perceived that user authentication has been requested, the private key inspection unit 123 invokes a private key issued in advance for the user identification information received at operation S301, and determines at operation S309 whether the invoked private key matches the private key received at operation S301.

In addition, when the determination shows that the private keys match at operation S309, the biometric information comparison unit 124 compares the biometric measurement information created at operation S305 with the pre-set biometric authentication information to calculate a matching ratio at operation S311.

Subsequently, the authentication unit 125 compares the matching ratio calculated at operation S311 with a pre-determined biometric authentication threshold value at operation S313, and authenticates the user of the information processing device 110 currently requesting authentication as an authorized user or notifies the user of authentication failure based on the result of comparison. For example, when the calculated matching ratio is greater than the pre-determined biometric authentication threshold value, the user is authenticated as an authorized user at operation S315, but notified of authentication failure if the calculated matching ratio is equivalent to or smaller than the pre-determined biometric authentication threshold value at operation S317.

Herein, biometric authentication in accordance with some embodiments may be carried out in the manner of 1:1 biometric authentication for comparing biometric information after a user is first specified by the private key issued in advance. In this case, it is possible to use relatively smaller biometric authentication threshold values in comparison with 1:N biometric authentication for comparing biometric information without specifying a user. It is because a private key-based authentication has been primarily carried out.

In addition, the private key update unit 126 may compare the matching ratio calculated at operation S311 with a pre-determined updated threshold value at operation S319, and update the private key issued to the information processing device 110 based on the result of comparison. For example, when the calculated matching ratio is greater than the updated threshold value at operation S319, the private key update unit 126 updates the private key at operation S321, and sends the updated private key to the information processing device 110 through short-range communication at operation S323.

The information processing device 110 may subsequently change the private key used before for the updated private key sent from the user authentication apparatus 120. Therefore, although the private key is stolen, security thereof may soon be restored by updating the private key.

Meanwhile, the updated threshold value used at operation S319 may be established greater than the biometric authentication threshold value used at operation S313. This aids to ensure maximized security of the private key. Although user authentication is carried out twice through S313 and S319, the private key may still be stolen. For example, when the information processing device 110 of the authorized user is used by a third-party user to masquerade as the authorized user for user authentication, 1:1 biometric authentication uses relatively smaller biometric authentication threshold values in comparison with 1:N biometric authentication as described above. Therefore, when the third-party user has similar biometric information, the third-party user may be authenticated as an authorized user. In this case, when the private key is updated, the original authorized user may be notified of authentication failure in subsequent user authentication.

However, when the updated threshold value used at operation S319 is established greater than the biometric authentication threshold value used at operation S313, the private key will not be updated although a third-party user with similar biometric information has been authenticated as an authorized user. Therefore, the original authorized user may not be notified of authentication failure in subsequent user authentication.

Next, the biometric authentication information update unit 127 may use the biometric measurement information used for user authentication and create updated biometric authentication information, when the calculated matching ratio is greater than the updated threshold value, as the result of operation S319 for comparing the matching ratio calculated at operation S311 with the updated pre-determined threshold value. This aims to enhance security by updating user's biometric information to be the most recent biometric information at operation S325 because it may change based on the environment.

An exemplary third embodiment will be described below with reference to FIGS. 1 and 4.

First, a private key may be issued to the information processing device 110 used by a user, and biometric information used for user authentication may be obtained from the user of the information processing device 110 to create biometric authentication information. In this embodiment, while the issued private key is registered and stored in the user authentication apparatus 120, the biometric authentication information is registered and stored in the information processing device 110. This aims to minimize the possibility that biometric information, the most credential personal information, may be stolen. Further, user identification information of the information processing device 110 is registered and stored in the user authentication apparatus 120 as well. For example, when the information processing device 110 is a smartphone or the like, its telephone number may be used as user identification information. The aforementioned user identification information and the private key may be stored in an internal memory of the biometric information comparison unit 124 and the authentication unit 125, or in a separate memory.

At this state, the user of the information processing device 110 operates the information processing device 110 to send the biometric authentication information, user identification information and private key stored in advance to the user authentication apparatus 120 when user authentication is required. In this case, the information processing device 110 and the user authentication apparatus 120 send/receive information each other through short-range communication, for example, NFC, WiFi and Bluetooth, at operation S401.

In addition, the user of the information processing device 110 provides biometric information to the user authentication apparatus 120. For example, the user cooperates with the user authentication apparatus 120 to capture the user's facial image or fingerprint image at operation S403. As a result, the camera obtains the user's facial image or the biometric information measurement unit 122 obtains the user's fingerprint image to create biometric measurement information at operation S405.

During this operation, the authentication request check unit 121 perceives that user authentication has been requested by the information processing device 110 when the private key is received at operation S401 and biometric measurement information is created in the biometric information measurement unit 122 at operation S407.

As described above, when it is perceived that user authentication has been requested, the private key inspection unit 123 invokes the private key established in advance for the user identification information received at operation S401, and determines at operation S409 whether the invoked private key matches the private key received at operation S401.

In addition, when the determination shows that the private keys match at operation S409, the biometric information comparison unit 124 compares the biometric measurement information created at operation S405 with the biometric authentication information received at operation S401 to calculate a matching ratio at operation S411.

Subsequently, the authentication unit 125 compares the matching ratio calculated at operation S411 with a pre-determined a pre-determined biometric authentication threshold value at operation S413, and authenticates the user of the information processing device 110 currently requesting user authentication as an authorized user or notifies the user of authentication failure based on the result of comparison. For example, when the calculated matching ratio is greater than the pre-determined biometric authentication threshold value, the user may be authenticated as an authorized user at operation S415, but notified of authentication failure if the calculated matching ratio is equivalent to or smaller than the pre-determined biometric authentication threshold value at operation S417.

Herein, biometric authentication in accordance with some embodiments may be carried out in the manner of 1:1 biometric authentication for comparing biometric information after a user is first specified by the private key issued in advance. In this case, it is possible to use relatively smaller biometric authentication threshold values in comparison with 1:N biometric authentication for comparing biometric information without specifying a user. It is because a private key-based authentication has been primarily carried out.

In addition, the private key update unit 126 may compare the matching ratio calculated at operation S411 with a pre-determined updated threshold value at operation S419, and update the private key issued to the information processing device 110 based on the result of comparison. For example, if the calculated matching ratio is above the updated threshold value at operation S419, the private key update unit 126 updates the private key at operation S421, and sends the updated private key to the information processing device 110 through short-range communication at operation S423.

The information processing device 110 may then change the private key used before for the updated private key sent from the user authentication apparatus 120. Therefore, although the private key is stolen, security thereof may soon be restored by updating the private key.

Meanwhile, the updated threshold value used at operation S419 may be established greater than the biometric authentication threshold value used at operation S413. This aims to ensure maximized security of the private key. Although user authentication is carried out twice through S413 and S419, the private key may be still stolen. For example, when the information processing device 110 of an authorized user is used by a third-party user to masquerade as the authorized user for user authentication, 1:1 biometric authentication uses relatively smaller biometric authentication threshold values in comparison with 1:N biometric authentication as described above. Therefore, when the third-party user has similar biometric information, the third-party user may be authenticated as an authorized user. In this case, when the private key is updated, the original authorized user may be notified of authentication failure in subsequent user authentication.

However, when the updated threshold value used at operation S419 is established greater than the biometric authentication threshold value used at operation S413, the private key will not be updated although a third-party user with similar biometric information has been authenticated as an authorized user. Therefore, the authorized user may not be notified of authentication failure in subsequent user authentication.

Next, the biometric authentication information update unit 127 may use the biometric measurement information used for user authentication to create updated biometric authentication information, when the calculated matching ratio is above the updated threshold value, as the result of S419 for comparing the matching ratio calculated at operation S411 with the updated pre-determined threshold value. This aims to enhance security by updating user's biometric information to be the most recent biometric information at operation S425 because it may also change based on the environment. The updated biometric authentication information created as described above is sent to the information processing device 110 through short-range communication, and the information processing device 110 changes the biometric authentication information used so far for updated biometric authentication information to be used at operation S427 for subsequent user authentication.

The combinations of the each component of the block diagram and each operation of the flow chart may be derived from computer program instructions. Because the computer program instructions may be loaded on a general purpose computer, a special purpose computer, or a processor of programmable data processing equipment, the instructions performed through the computer or the processor of the programmable data processing equipment may generate the means performing functions described in the each block of the block diagram and each operation of the flow chart. Because the computer program instructions may be stored in computer readable memory or a memory usable in a computer which is capable of intending to a computer or other programmable data processing equipment in order to embody a function in a specific way, the instructions stored in the computer usable memory or computer readable memory may produce a manufactured item involving the instruction means performing functions described in the each block of the block diagram and each operation of the flow chart. Because the computer program instructions may be loaded on the computer or other programmable data processing equipment, the instructions derived from the computer or programmable data processing equipment may provide the operations for executing the functions described in the each block of the block diagram and each operation of the flow chart by a series of functional operations being performed on the computer or programmable data processing equipment, thereby a process executed by a computer being generated.

Moreover, the respective blocks or the respective sequences may indicate modules, segments, or some of codes including at least one executable instruction for executing a specific logical function(s). In several alternative embodiments, it is noticed that the functions described in the blocks or the sequences may run out of order. For example, two successive blocks and sequences may be substantially executed simultaneously or often in reverse order according to corresponding functions.

The explanation as set forth above is merely described a technical idea of exemplary embodiments of the methods and apparatuses described herein. It is further understood by those skilled in the art to which features of this disclosure belongs that various changes and modifications may be made without departing from the scope of the essential characteristics of the embodiments of the methods and apparatuses described herein. Therefore, the exemplary embodiments disclosed herein are not used to limit the technical ideas, but to explain the exemplary embodiments described herein, and the scope of the technical idea is not limited to these embodiments. Therefore, the scope of protection should be construed to be defined by the following claims. Changes, modifications and equivalents that fall within the technical idea of the methods and apparatuses described herein are intended to be embraced by the scope of the claims.

What is claimed is:

1. A method for authenticating a user, the method comprising:
    obtaining a user authentication request signal including a private key from an information processing device by determining the user authentication request signal has been obtained when the private key and user identification information are sent from the information processing device via Near Field Communication (NFC);
    measuring biometric information of the user and creating biometric measurement information based on the measurement;
    detecting whether the private key included in the user authentication request signal matches a private key issued in advance to the user;
    comparing pre-set biometric authentication information for the user with the biometric measurement information and calculating a matching ratio between the pre-set biometric authentication information for the user and the biometric measurement information by comparing the pre-set biometric authentication information sent from the information processing device via the NFC with the biometric measurement information, when a match is detected based on a result of the comparison of the two private keys;
    comparing the calculated matching ratio with a pre-determined biometric authentication threshold value;
    authenticating the user having provided the biometric information as an authorized user based on the comparison of the calculated matching ratio with the pre-determined biometric authentication threshold value;
    comparing the calculated matching ratio with a pre-determined updated threshold value; and
    providing an updated private key to the information processing device by controlling transmission of the updated private key to the information processing device via the NFC, when the calculated matching ratio is greater than the pre-determined updated threshold value based on a result of the comparison of the calculated matching ratio with the pre-determined updated threshold value, wherein the pre-determined updated threshold value is set to have a greater value than the biometric authentication threshold value; and
    generating updated biometric authentication information according to use of the biometric measurement information based on the result of comparison of the calculated matching ratio with the pre-determined updated threshold value, the updated biometric authentication information being provided to the information processing device through the NFC.

2. The method of claim 1, wherein obtaining the user authentication request signal comprises:
    determining that the user authentication request signal has been obtained when a code image with the private key included in the user authentication request signal and visually outputted by the information processing device is captured; and
    extracting the private key from the code image.

3. The method of claim 2, wherein obtaining the user authentication request signal comprises:
    visually presenting the code image including specific information, wherein the code image is configured to enable the information processing device to capture the code image via a camera, wherein the code image outputted by the information processing device comprises the private key and the specific information.

4. An apparatus for authenticating a user, the apparatus comprising:
    an authentication request check unit configured to obtain a user authentication request signal including a private key from an information processing device by determining the user authentication request signal has been obtained when the private key and user identification information are sent from the information processing device via Near Field Communication (NFC);
    a biometric information measurement unit configured to measure biometric information of the user and create biometric measurement information based on the measurement; and
    at least one processors, implementing:
    a private key inspection unit configured to detect whether the private key included in the user authentication request signal matches a private key issued in advance to the user;
    a biometric information comparison unit configured to compare pre-set biometric authentication information for the user with the biometric measurement information to calculate a matching ratio between the pre-set biometric authentication information for the user and the biometric measurement information by comparing the pre-set biometric authentication information sent from the information processing device via the NFC with the biometric measurement information, when a match is detected;
    an authentication unit configured to authenticate the user having provided the biometric information as an authorized user based on a result of comparing the calculated matching ratio with a pre-determined biometric authentication threshold value; and
    a private key update unit configured to provide an updated private key to the information processing device by controlling transmission of the updated private key to the information processing device via the NFC, when the calculated matching ratio is greater than the pre-determined updated threshold value between the preset biometric authentication information for the user and the biometric measurement information based on a result of comparing the calculated matching ratio with a pre-determined updated threshold value, wherein the pre-determined updated threshold value is set to have a greater value than the biometric authentication threshold value, and a biometric authentication information update unit configured to generate updated biometric authentication information according to use of the biometric measurement information based on the result of comparison of the calculated matching ratio with the pre-determined updated threshold value, the updated biometric authentication information being provided to the information processing device through the NFC.

5. The device of claim 4, wherein the authentication request check unit is configured to:

determine the user authentication request signal has been obtained when a code image with the private key included in the user authentication request signal and visually outputted by the information processing device is captured; and extract the private key from the code image.

6. The device of claim 5, wherein the authentication request check unit is configured to visually present the code image including specific information, wherein the code image is configured to enable the information processing device to capture the code image via a camera, wherein the code image outputted by the information processing device comprises the private key and the specific information.

* * * * *